United States Patent [19]

Hopperdietzel

[11] Patent Number: 5,069,947
[45] Date of Patent: Dec. 3, 1991

[54] METHOD FOR LAMINATING A PLASTIC WEB ONTO A PLASTIC SUBSTRATE

[75] Inventor: Siegfried Hopperdietzel, Selb, Fed. Rep. of Germany

[73] Assignee: Rehau AG & Co., Rehau, Fed. Rep. of Germany

[21] Appl. No.: 354,441

[22] Filed: May 17, 1989

[51] Int. Cl.$^5$ ................................. B44C 5/08
[52] U.S. Cl. ...................... 428/38; 49/507; 49/DIG. 2; 52/211; 52/717.1; 156/108; 156/264; 156/281; 156/284; 156/310; 156/324; 156/244.19; 428/212; 428/327
[58] Field of Search ............... 156/310, 324, 284, 264, 156/244.19, 108, 281; 52/717.1; 428/327, 212, 38; 49/507, 516.2

[56] References Cited

U.S. PATENT DOCUMENTS 2,706,699  4/1955  Planvoen et al. .............. 156/324
4,552,605  11/1985  Itoh et al. .................... 156/324

Primary Examiner—John J. Gallagher
Attorney, Agent, or Firm—Spencer & Frank

[57] ABSTRACT

In a method for laminating a plastic web onto a plastic substrate, the web is moved past an adhesive coating station where one surface is coated with a mixture made of solvent and resin particles. The substrate is moved past a cleaning station, where a surface is also coated with a mixture made of solvent and resin. After the web and substrate pass through drying chambers, the coated surfaces are pressed together with rollers and heat is applied. The method is particularly suitable for laminating strips bearing a woodgrain pattern onto extruded thermoplastic members which are thereafter cut into segments for use in making prefabricated window systems.

24 Claims, 4 Drawing Sheets

METHOD FOR LAMINATING A PLASTIC WEB ONTO A PLASTIC SUBSTRATE

BACKGROUND THE INVENTION

The present application is directed to a method for laminating a plastic web onto the surface of an extruded plastic substrate. The plastic web may be a facade strip having a textured appearance and the extruded plastic substrate may be cut into segments after lamination for use in making prefabricated window systems.

An example of a prior art window system having extruded members will now be described with reference to FIG. 1. The window system includes a rectangular mainframe having a top frame portion 10, a bottom frame portion 12, and side frame portions 14 which connect portions 10 and 12. Frame portions 10-14 are made from extruded polyvinyl chloride (PVC) and all have the same cross-sectional configuration, except for features such as drainage channels which are fabricated after extrusion. Because they have the same cross-sectional configuration, frame portions 10-14 can be cut from a long substrate (not shown in FIG. 1) of extruded PVC. Frame portions 10-14 are joined at their corners by edge welds 16 and lateral welds 18 (which are also present on the side of the window system not shown in FIG. 1). The term "weld" in this context means that the corners have been joined by molten PVC which, when it cools, seals one frame portion to an adjacent frame portion along a smooth seam.

The side frame portions 14 provide channels for guiding a screen member 18 and for guiding window units 20 and 22 (which have sashes made from segments cut from an elongated substrate of extruded PVC, not illustrated). Window units 20 and 22 can be unlatched from the channels and tilted out for cleaning as shown. Since the top and bottom frame portions 10 and 12 have the same cross-sectional configuration as the side frame portions 14, channels are also present in top and bottom frame portions 10 and 12. An extruded PVC sill 24 is provided with resilient legs which permit sill 24 to be snap-connected to bottom frame portion 12. Balance mechanisms 25 (only one of which is shown) are mounted in the window guidance channels of side frame portions 14 to counterbalance the weight of window units 20 and 22. Window stops 26 (only two of which are shown) are snap-connected to side frame portions 14 to limit the movement of window units 20 and 22 so as to prevent possible damage to hardware mounted on the window units should they be slammed up or down.

FIG. 2 is a cross-sectional view of the bottom portion of the window system shown in FIG. 1, in its installed state. A rectangular opening in a wall 28 is framed by wooden strips 30 and interior trim 32. Nailing fins 34 are lodged into slots in frame portions 10-14 and are nailed into wall 28 to mount the window system in wall 28.

Further information about the construction of the window system can be found in U.S. application Ser. No. 06/929,303, filed Nov. 12th, 1986, the disclosure of which is incorporated herein by reference.

Since the process of extruding a plastic substrate leaves its own characteristically bland appearance to the surfaces of the substrate, in the past facade strips have been laminated to major visible surfaces of prefabricated plastic window systems to provide a wood-grain appearance. Such strips additionally increase the resistance of the window systems to weathering. However prior art techniques for laminating facade strips to extruded plastic substrates have not been entirely satisfactory. Facade strips laminated with prior art methods have had a tendency to become loose at the ends when segments are cut from a substrate and welded together. Furthermore, due to rough handling that may be encountered during transportation, storage, and installation of prefabricated window systems, the lateral edges of facade strips applied by prior art techniques may peel in places. Long years of exposure to the elements after installation, and possibly the prying hands of small children, may lead to further peeling.

In one prior art method for laminating a facade strip to an extruded plastic substrate, the substrate is moved through a cleaning station, where it is cleaned with soap suds. After drying, an adhesive-backed facade strip is pressed onto the member with rollers.

SUMMARY OF THE INVENTION

An object of the invention is to provide an improved process for laminating a web such as a facade strip to a plastic substrate, and the laminated substrate resulting from the process. A related object is to provide a process for laminating a web tightly to a substrate so that the web does not become detached.

These and other objects which will become apparent in the ensuing detailed description can be obtained by providing a process wherein a surface of the web is coated with a first mixture of solvent and resin and a surface of the substrate is coated with a second mixture of solvent and resin. The solvent and resin have different ratios in the first and second mixtures. The web is then laminated to the substrate by pressing the coated surfaces together and applying heat.

The substrate is preferably made of hard polyvinyl chloride, and the web preferably includes a polymer layer such as hard polyvinyl chloride and a weather proof covering layer such as acrylic. The same type of solvent is preferably used in both mixtures, and preferably the same type of resin is used in both mixtures. The solvent may be dichloromethane and the resin may be a polyester resin.

The mixture coated onto the web preferably has a thickness ranging from about 0.03 mm to about 0.09 mm when it is applied, with subsequent evaporation of solvent reducing the layer thickness to about 0.02 mm before the web and substrate are joined. Within the thickness range of about 0.03 mm to about 0.09 mm when the mixture is applied, a thickness of about 0.06 mm is preferred.

In accordance with another aspect of the invention, in a process for laminating an elongated plastic web to an elongated substrate of extruded thermoplastic the web is moved along a first path and the substrate is moved along a second path, the second path being substantially straight. Each path has an initial portion and a final portion, with the final portions of the first and second paths coinciding. A first mixture is prepared by mixing solvent and resin particles, and the first mixture is coated onto a surface of the web as it moves along the initial portion of the first path. A second mixture is prepared by mixing solvent and resin particles, and the second mixture is applied to the substrate as it moves along the initial portion of the second path. The first mixture has a first ratio of solvent to resin and the second mixture has a different, second ratio of solvent to resin. The coated surfaces are pressed together with at least one pressure roller as the web and substrate move along the common, final portions of the first and second paths.

In accordance with a further aspect of the invention, in a process for making a window system a facade strip is moved along a first path and an elongated substrate of extruded plastic is moved along a second path, which is substantially straight. Both paths have initial and final portions, with the final portions coinciding. A first mixture of solvent and resin particles is prepared and coated onto a surface of the facade strip as it moves along the initial portion of the first path. Similarly, a second mixture of solvent and resin particles is prepared and coated onto a surface of the substrate as it moves along the initial portion of the second path. The ratio of solvent to resin in the mixtures is different. The facade strip is attached to the substrate by pressing the coated surface of the strip against the coated surface of the substrate with at least one pressure roller as the strip and substrate move along the final portions on their paths. Thereafter the substrate is cut into a plurality of sections. A rectangle is formed by joining four sections together.

DESCRIPTION OF THE PREFERRED EMBODIMENT

Figure 1:
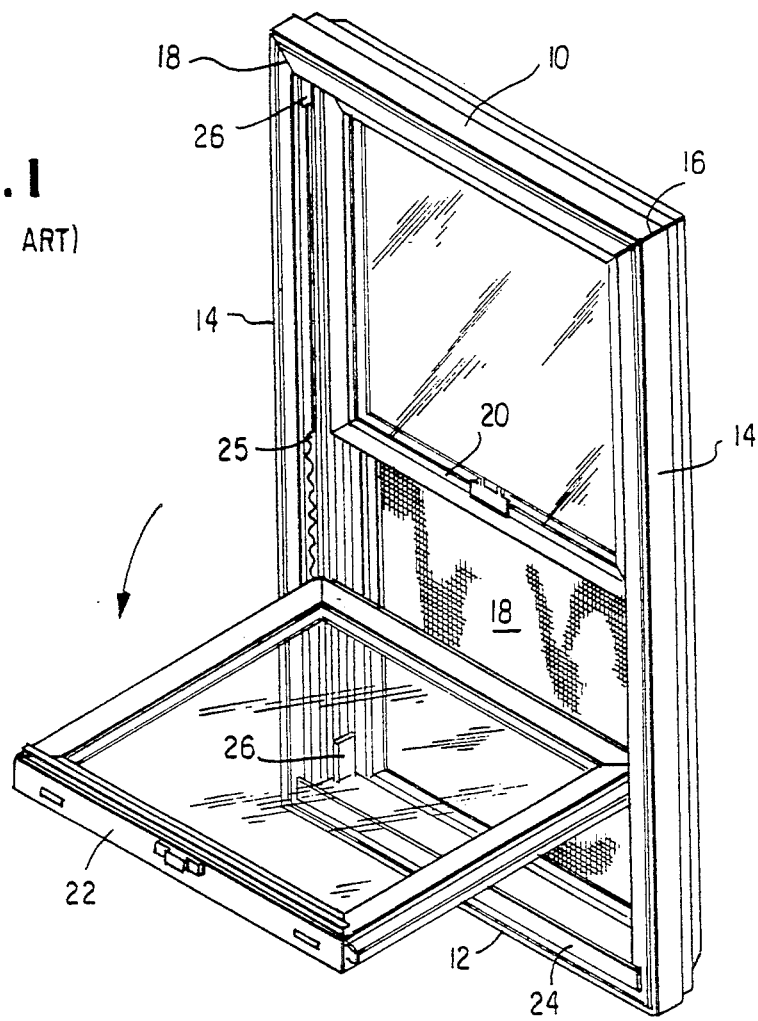
FIG. 1 is a perspective view of a prior art window system having extruded plastic members.

The process of the present invention may be employed to laminate webs such as facade strips to various extruded PVC substrates before the window system of FIG. 1 is fabricated, thereby improving the appearance and weather-resistance of major visible surfaces of the window system. For example, facade strips may be used to impart a textured or wood-grain appearance to surfaces 36, 38, and 40 (see FIG. 2) of frame portions 10–14 in FIG. 1, as will be described in detail below. Although not all major visible surfaces of the window system need facade strips in order to provide a substantial aesthetic improvement, facade strips are preferably also laminated to the major visible surfaces of sill 24, the sashes of window units 20 and 22, and stops 26.

Figure 2:
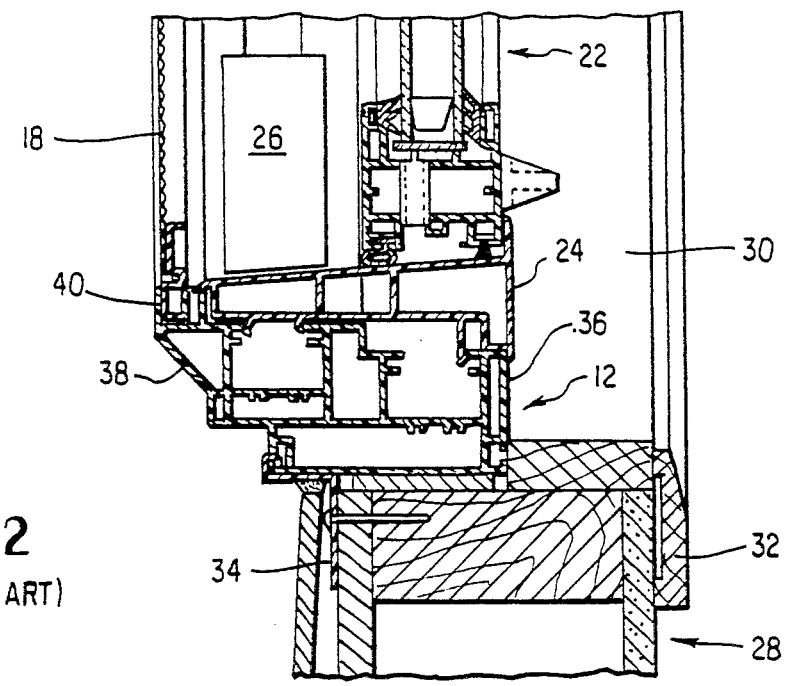
FIG. 2 is a vertical sectional view through the bottom portion of the window system of FIG. 1 after installation in a building.
Figure 4:
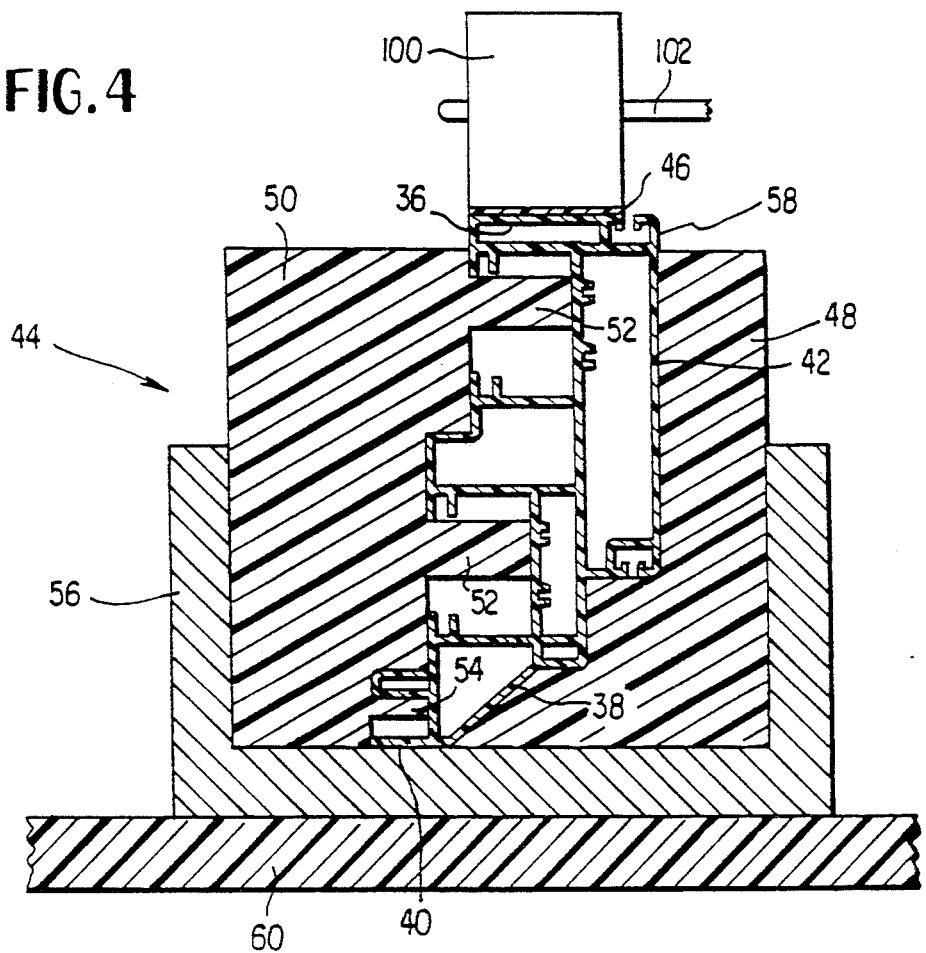
FIG. 4 is a cross-sectional view taken through line 4—4 of FIG. 3.

In FIG. 4, an elongated, extruded PVC substrate 42 is retained in a support 44 while a web such as facade strip 46 is laminated on surface 36 (see FIG. 2). Support 44 includes a first elongated prop 48 which conforms generally to one side of substrate 42 and a second elongated prop 50 which conforms generally to the other side. Prop 50 includes tongues 52 which extend into what will become the window channels of side frame portions 14 (see FIG. 1), and a tongue 54 which extends into what will become the screen channel. Tongues 52 and 54 support various walls and flanges of substrate 42 so as to reduce deformation of substrate 42, when pressure is applied at surface 36, to a negligible amount. Support 44 also includes an elongated trough 56 which holds props 48 and 50, with substrate 42 sandwiched between them. A portion 58 of substrate 42 rises above props 48 and 50.

Figure 3:
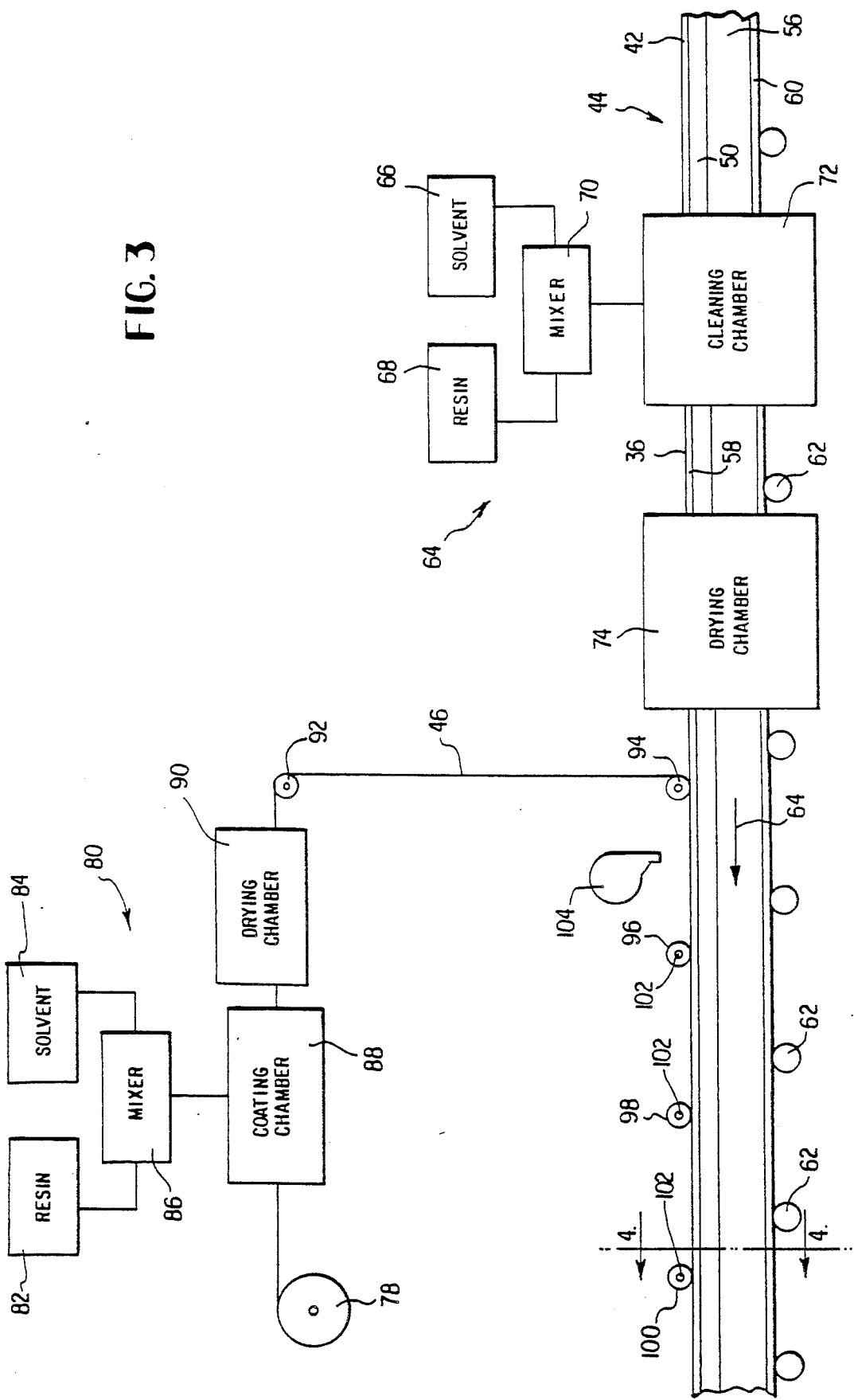
FIG. 3 is a side view schematically illustrating an apparatus for laminating a facade strip to a plastic substrate in accordance with the method of the present invention, the substrate and laminated facade strip thereafter being cut into segments for fabrication of the mainframe of the window system shown in FIGS. 1 and 2.

FIG. 3 schematically illustrates an installation for laminating the strip 46 onto substrate 42. A conveyor belt 60 is transported by rollers 62 to advance support 44 in the direction of arrow 64. The substrate 42 moves beneath a cleaning station 64, which includes a solvent dispenser 66, a resinous particle dispenser 68, a mixer which 70 mixes the solvent and particles, and a cleaning chamber 72 in which the mixture is wiped onto surface 36 of substrate 42. The solvent is preferably methylene choride and the resin is preferably a polyester resin. The mixture of resin and solvent is about 5% by weight resin and about 95% by weight solvent.

After exiting the cleaning station 64, the coated surface 36 moves into an elongated drying chamber 74. The solvent is removed here by evaporation, leaving a sticky surface. Chamber 74 is preferably maintained at a temperature between 50° C. and 60° C.

Figure 5:
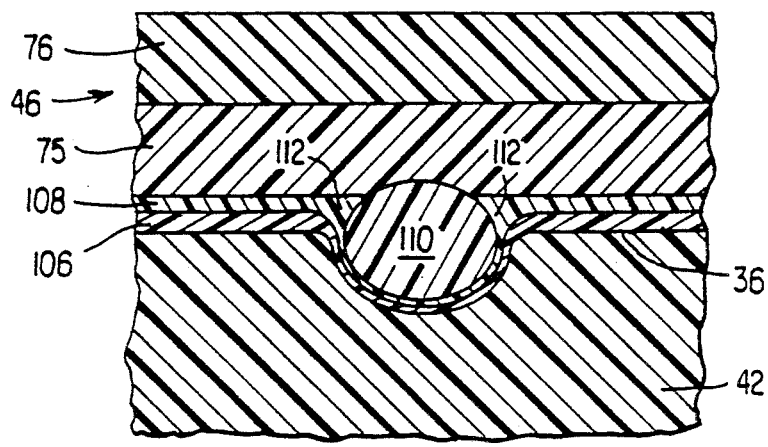
FIG. 5 is a sectional view through the facade strip and a portion of the substrate after lamination.

As is shown in FIG. 5, facade strip 46 has a base layer 75 of hard PVC and an acrylic layer 76 which is bonded to layer 75. Layer 76, which is textured to provide a woodgrain appearance, is extremely water-resistant. Layers 75 and 76 are each 0.1 mm thick. Returning to FIG. 3, the facade strip 46 is unwound from a supply reel 78 and travels past an adhesive-coating station 80. Adhesive coating station 80 includes a resinous particle dispenser 82, a solvent dispenser 84, a mixer 86, and a coating chamber 88. The resin is again preferably a polyester resin and the solvent is again preferably methylene chloride. The mixture preferably includes about 30% by weight resin and about 70% by weight solvent. The mixture is coated onto strip 46 so as to form a layer ranging from about 0.03 mm to about 0.09 mm thick (preferably about 0.06 mm). After leaving the adhesive coating station 80 the strip 46 advances into drying chamber 90, which is preferably maintained at a temperature of 50° C. to 60° C. in order to evaporate the solvent. An adhesive layer remains after drying, the adhesive layer preferably being about 0.02 mm thick. After it exits drying chamber 90, the adhesive-coated strip 46 passes over deflection roller 92 and begins moving downward. It will be apparent that the side of strip 46 that is coated with adhesive faces away from roller 92.

The direction of strip 46 changes again at pressure roller 94, where the initial stage of the actual lamination of strip 46 to surface 36 occurs. Pressure roller 94 is followed by pressure rollers 96, 98, and 100. Pressure rollers 94–100 are rotatably mounted on shafts 102 which are spaced about a meter apart. Rollers 94–100 press the coated strip 46 against the coated surface 36 of substrate 42. Although not illustrated, the vertical positions of shafts 102 may be adjusted to different heights to accommodate the dimensions of various substrates (not illustrated) on which facade strips are to be laminated. Heated blowers 104 (only one of which is shown) are positioned between pressure rollers 94–100 to direct hot air toward the strip 46 and substrate 42 as the pressure is being applied by rollers 94–100. The hot air extends the entire width of strip 46 and preferably has a temperature in the range of 60° C. to 100° C.

It has been found that a strip 46 laminated by means of the process of the present invention sticks with remarkable tenacity to the underlying surface 36. After lamination and curing for seven days, it has been found that strip 46 can only be torn off in patches if a deliberate attempt is made to remove it. That is, the strip itself is destroyed, and not the adhesive interface.

With reference to FIG. 5, the reason for the remarkable adhesion attained by the method of the present invention is believed to be as follows: The resinous particles from dispensers 68 and 82 do not entirely dissolve in the solvent, and leave undissolved particles in the micron range after the solvent has been evaporated in drying chambers 74 and 90. Furthermore a small portion of the solvent migrates into the surfaces of substrate 42 and layer 75 of strip 46, and is not evaporated during passage through drying chambers 74 and 90 but instead temporarily softens the surface regions of substrate 42 and layer 75. FIG. 5 illustrates an adhesive layer 106 which results when the mixture applied to substrate 42 has been dried in chamber 74, and an adhesive layer 108 which results when the mixture applied to strip 46 has been dried in chamber 90. Layers 106 and 108 represent the residue remaining from completely dissolved resin after the solvent has been evaporated. FIG. 5 also illustrates a resin particle 110 which was not completely dissolved when the mixture was coated onto strip 46. Due to surface tension in the mixture around particle 110 immediately after coating, adhesive layer 108 has portions 112 of increased thickness immediately adjacent particle 110. When strip 46 is pressed against surface 36 by pressure rollers 94–100, adhesive layers 106 and 108 stick tightly (and after a curing period the layers 106 and 108 merge into each other so as to become a single layer). Furthermore particle 110 is slightly flattened by the pressure, and protrudes into the softened surface regions of substrate 42 and strip 46. The particle 110, which is securely held to strip 46 by portions 112, thus bites into both the strip 46 and substrate 42 to increase the mechanical strength of the bond between the two. Furthermore the presence of particle 110, and a myriad of others (not illustrated) like it, roughens the surfaces to be joined and increases the bonding area, as is apparent from the thinning of layers 106 and 108 in FIG. 5 as they pass beneath particle 110. In short, it is believed that particles of resin remain un-dissolved and augment the adhesive effect in the manner described in this paragraph and illustrated schematically in FIG. 5; regardless of whether or not this theory explaining the superior adhesion is accurate or not, however, the fact remains that t he lamination procedure illustrated in FIG. 3 achieves firm bonding between the strip 46 and the substrate 42.

Figure 6:
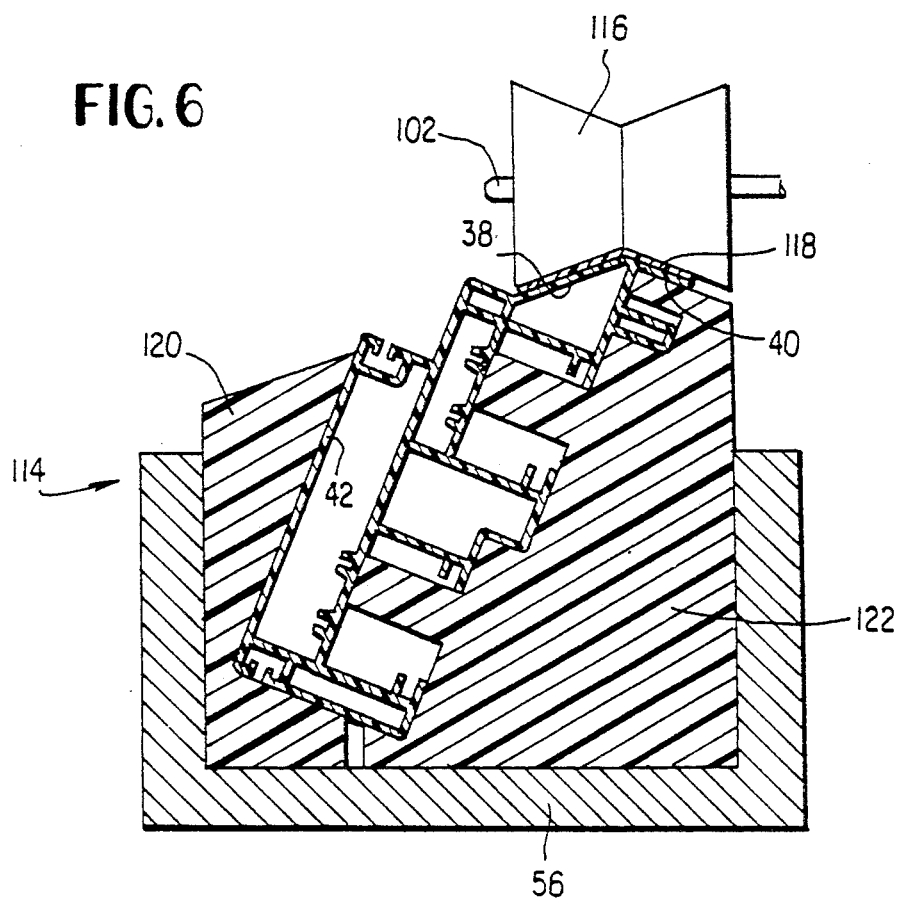
FIG. 6 is a sectional view corresponding to FIG. 4, but illustrating the substrate supported in a different orientation so that a differently-configured pressure roller can laminate a facade strip on different surfaces.

FIG. 6 illustrates a support 114 for holding the substrate 42 while modified pressure rollers 116 (only one of which is shown) press a facade strip 118 against surfaces 38 and 40 (see FIG. 2) of substrate 42. Support 114 includes a prop 120 and a prop 122 with support tongues which extend into the channels of member 42. Support 114 additionally includes the trough 56, which encloses props 120 and 122.

After strips 46 and 118 have been laminated onto substrate 42, the substrate 42 is cut into segments for use as frame portions 10–14 of the window system shown in FIGS. 1 and 2.

Figure 7:
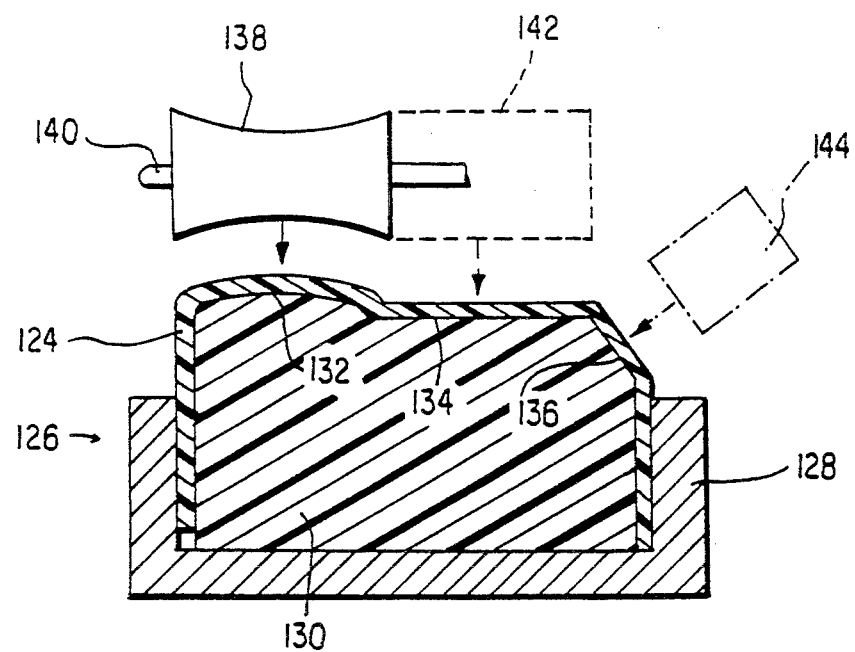
FIG. 7 is a sectional view illustrating a modified embodiment wherein different pressure rollers are used to laminate a web to different portions of the surface of a substrate.

In the embodiment schematically illustrated in FIG. 7, an elongated substrate 124 of extruded thermoplastic is held by a support 126 which includes a trough 128 and an elongated backing element 130. Substrate 124 includes a curved portion 132, a first flat portion 134, and a second flat portion 136 to which an elongated web (not shown) is to be laminated. As is illustrated, the upper surface of backing element 130 conforms to portions 132, 134, and 136. Pressure roller 138 is rotatably mounted on shaft 140, which urges pressure roller 138 in the direction of the arrow shown with a solid line so as to press the web against the surface of portion 132. It should be noted that the surface of roller 138 conforms to the curve of portion 132. A pressure roller 142, shown in dotted lines to indicate that it is located behind roller 138 and beneath the plane of the drawing, presses the web against surface 134. This is indicated by the arrow shown with a dotted line. Behind roller 142 and thus further beneath the plane of the drawing is a pressure roller 144 which presses the web against portion 136.

It will be understood that the above description of the present invention is susceptible to various modifications, changes, and adaptations, and the same are intended to be comprehended within the meaning and range of equivalents of the appended claims.

What I claim is:

1. A process for attaching a web to a plastic substrate, comprising the steps of:
   (a) coating a surface of the web with a first mixture which includes resin and solvent for the resin of the first mixture, the first mixture having a first ratio of solvent to resin;
   (b) coating a surface of the substrate with a second mixture which includes resin and solvent for the resin of the second mixture, the second mixture having a second ratio of solvent to resin, the second ratio being substantially different from the first ratio; and
   (c) laminating the web to the substrate by pressing the coated surfaces together and applying heat,
   wherein the substrate is made of polyvinyl chloride, wherein the web includes a polymer layer and a weatherproof covering layer bonded to the polymer layer, and wherein step (a) is conducted by coating the polymer layer of the web with the first mixture.

2. The method of claim 1, wherein the first ratio is about 70% by weight solvent to about 30% by weight resin, and wherein the second ratio is about 95% by weight solvent to about 5% by weight resin.

3. The process of claim 1, wherein the same type of solvent is used in the first and second mixtures.

4. The process of claim 3, wherein the solvent in the first and second mixtures comprises methylene chloride.

5. The process of claim 1, wherein the same type of resin is used in the first and second mixtures.

6. The process of claim 5, wherein the resin in the first and second mixtures is a polyester resin.

7. The process of claim 1, wherein during step (c) a close connection is made between the resin on the surface of the web and the resin on the surface of the substrate.

8. The process of claim 1, wherein step (a) is conducted so as to coat the surface of the web with a layer of mixture having a thickness ranging from about 0.03 mm and about 0.09 mm, and further comprising the step of evaporating solvent from the layer, prior to conducting step (c), until the layer has a thickness of about 0.02 mm.

9. The process of claim 1, wherein step (a) is conducted so as to coat the surface of the web with a layer of mixture having a thickness of about 0.06 mm, and further comprising the step of evaporating solvent from the layer, prior to conducting step (c), until the layer has a thickness of about 0.02 mm.

10. A laminated substrate made by the process of claim 1.

11. The process of claim 1, wherein a small portion of the solvent in the second mixture migrates into the substrate and softens the surface of the substrate.

12. A process for attaching a web to a plastic substrate, comprising the steps of:
(a) coating a surface of the web with a first mixture which includes resin and solvent for the resin of the first mixture, the first mixture having a first ratio of solvent to resin;
(b) coating a surface of the substrate with a second mixture which includes resin and solvent for the resin of the second mixture, the second mixture having a second ratio of solvent to resin, the second ratio being substantially different from the first ratio; and
(c) laminating the web to the substrate by pressing the coated surfaces together and applying heat,
wherein the substrate is made of hard polyvinyl chloride, wherein the web includes a hard polyvinyl chloride layer and an acrylic layer bonded to the hard polyvinyl chloride layer, and wherein step (a) is conducted by coating the hard polyvinyl chloride layer of the web with the first mixture.

13. A process for laminating an elongated plastic web to an elongated plastic substrate, comprising the steps of:
(a) moving the web along a first path having initial and final portions;
(b) moving the substrate along a second path which is substantially straight, the second path having an initial portion which does not coincide with the initial portion of the first path and having a final portion which coincides with the final portion of the first path;
(c) preparing a first mixture by mixing resin particles and solvent for the resin particles of the first mixture, the first mixture having a first ratio of solvent to resin;
(d) coating the first mixture onto a surface of the web as the web moves along the initial portion of the first path;
(e) preparing a second mixture by mixing resin particles and solvent for the resin particles of the second mixture, the second mixture having a second ratio of solvent to resin, the second ratio being substantially different from the first ratio;
(f) coating the second mixture onto a surface of the substrate as the substrate moves along the initial portion of the second path; and
(g) pressing the coated surface of the web against the coated surface of the substrate with at least one pressure roller as the web and substrate move along the final portions of the first and second paths.

14. The method of claim 13, wherein the first ratio is about 70% by weight solvent to about 30% by weight resin, and wherein the second ratio is about 95% by weight solvent to about 5% by weight resin.

15. The method of claim 13, further comprising the step of heating the web during step (g).

16. The method of claim 13, further comprising the step of passing the web through a drying chamber after step (d) has been conducted.

17. The method of claim 13, further comprising the step of passing the substrate through a drying chamber after step (f) has been conducted.

18. The method of claim 13, wherein step (d) is conducted before all the resin particles in the first mixture have been dissolved in the solvent of the first mixture.

19. The method of claim 13, wherein step (f) is conducted before all the resin particles of the second mixture have been dissolved in the solvent of the second mixture.

20. A laminated substrate made in accordance with claim 13.

21. The process of claim 13, wherein a small portion of the solvent in the second mixture migrates into the substrate and softens the surface of the substrate.

22. A process for making a window system, comprising the steps of:
(a) moving a facade strip along a first path having initial and final portions;
(b) moving an elongated substrate of extruded thermoplastic along a second path which is substantially straight, the second path having an initial portion which does not coincide with the initial portion of the first path and having a final portion which coincides with the final portion of the first path;
(c) preparing a first mixture by mixing resin particles and solvent for the resin particles of the first mixture, the first mixture having a first ratio of solvent to resin;
(d) coating the first mixture onto a surface of the strip as the strip moves along the initial portion of the first path;
(e) preparing a second mixture by mixing resin particles and solvent for the resin particles of the second mixture, the second mixture having a second ratio of solvent to resin, the second ratio being substantially different from the first ratio;
(f) coating the second mixture onto a surface of the substrate as the substrate moves along the initial portion of the second path;
(g) attaching the strip to the substrate by pressing the coated surface of the strip against the coated surface of the substrate with at least one pressure roller as the strip and substrate move along the final portions of the first and second paths;
(h) cutting the substrate into a plurality of sections, each section having a corresponding portion of the strip attached thereto;
(i) joining four sections together to form a rectangular mainframe for the window system; and
(j) mounting at least one window unit in the mainframe.

23. The process of claim 22, wherein a small portion of the solvent in the second mixture migrates into the substrate and softens the surface of the substrate.

24. A window system made by the method of claim 22.

* * * * *